United States Patent
Hsieh et al.

(10) Patent No.: US 8,922,076 B2
(45) Date of Patent: Dec. 30, 2014

(54) ENCAPSULATED STATOR

(75) Inventors: Kun-Li Hsieh, Kaohsiung (TW); Ming-Fu Wu, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 340 days.

(21) Appl. No.: 13/275,443

(22) Filed: Oct. 18, 2011

(65) Prior Publication Data
US 2013/0020885 A1     Jan. 24, 2013

(30) Foreign Application Priority Data
Jul. 21, 2011    (TW) ............... 100125849 A

(51) Int. Cl.
| H02K 7/00 | (2006.01) |
|---|---|
| H02K 5/128 | (2006.01) |
| H02K 1/18 | (2006.01) |
| H02K 5/08 | (2006.01) |
| H02K 5/167 | (2006.01) |

(52) U.S. Cl.
CPC ............. *H02K 5/08* (2013.01); *H02K 11/073* (2013.01); *H02K 5/128* (2013.01); *H02K 1/187* (2013.01); *H02K 5/1675* (2013.01)
USPC ........................................ 310/67 R; 310/43

(58) Field of Classification Search
CPC ..................................................... H02K 5/128
USPC ................................................. 310/67 R, 43
See application file for complete search history.

(56) References Cited

U.S. PATENT DOCUMENTS

| 2,611,930 A | * | 9/1952 | Hill et al. ...................... 264/102 |
|---|---|---|---|
| 2,922,902 A | * | 1/1960 | Hargreaves ..................... 310/43 |
| 3,046,604 A | * | 7/1962 | Graham et al. .................. 249/91 |
| 3,135,885 A | * | 6/1964 | Maynard ......................... 310/87 |
| 3,436,569 A | * | 4/1969 | Kimball Jr. et al. ............. 310/43 |
| 5,490,319 A | * | 2/1996 | Nakamura et al. ............... 29/596 |
| 5,672,927 A | * | 9/1997 | Viskochil ....................... 310/194 |
| 6,040,647 A | * | 3/2000 | Brown et al. .................... 310/89 |
| 6,081,056 A | * | 6/2000 | Takagi et al. .................... 310/89 |
| 6,617,736 B1 | * | 9/2003 | Horng et al. ..................... 310/91 |
| 6,803,689 B2 | * | 10/2004 | Rupp et al. ..................... 310/91 |
| 6,844,636 B2 | * | 1/2005 | Lieu et al. ...................... 310/43 |

(Continued)

FOREIGN PATENT DOCUMENTS

| CN | 101902090 A | | 12/2010 |
|---|---|---|---|
| TW | 200835120 A | * | 8/2008 |

(Continued)

OTHER PUBLICATIONS

Translation of foreign document TW 200835120 A (Year 2008).*

*Primary Examiner* — Alex W Mok
(74) *Attorney, Agent, or Firm* — Alan Kamrath; Kamrath IP Lawfirm, P.A.

(57) ABSTRACT

An encapsulated stator includes a driving module coupled to a shaft tube. The driving module includes a silicon steel plate unit. A coil unit is wound around the silicon steel plate unit. A jacket is mounted to an outer periphery of the silicon steel plate unit of the driving module. The jacket includes an inner face and an outer face opposite to the inner face. The inner face of the jacket faces the driving module. An encapsulant is bonded to the driving module, the jacket, and the shaft tube. The encapsulant encapsulates the driving module. The encapsulant partially encapsulates the outer face of the jacket.

41 Claims, 8 Drawing Sheets

(56) References Cited

U.S. PATENT DOCUMENTS

| | | | |
|---|---|---|---|
| 7,042,124 B2* | 5/2006 | Puterbaugh et al. | 310/89 |
| 7,635,934 B2 | 12/2009 | Zhu et al. | |
| 7,667,359 B2* | 2/2010 | Lee et al. | 310/86 |
| 7,994,663 B2* | 8/2011 | Harata et al. | 310/43 |
| 2003/0160530 A1* | 8/2003 | Horng et al. | 310/91 |
| 2005/0093379 A1* | 5/2005 | Tanabe et al. | 310/43 |
| 2007/0126296 A1* | 6/2007 | Lee et al. | 310/86 |
| 2007/0145842 A1* | 6/2007 | Zhu et al. | 310/88 |
| 2008/0042499 A1* | 2/2008 | Okada | 310/43 |
| 2008/0252165 A1* | 10/2008 | Riedl et al. | 310/156.08 |
| 2009/0273254 A1* | 11/2009 | Heim | 310/195 |
| 2010/0133928 A1* | 6/2010 | Harata et al. | 310/43 |
| 2011/0074235 A1* | 3/2011 | Leung et al. | 310/62 |

FOREIGN PATENT DOCUMENTS

| | | |
|---|---|---|
| TW | I266469 B | 11/2008 |
| TW | 200952578 | 12/2009 |
| TW | I323071 | 4/2010 |

* cited by examiner

ENCAPSULATED STATOR

BACKGROUND OF THE INVENTION

1. Field of the Invention

The present invention relates to an encapsulated stator and, more particularly, to a stator including a driving module encapsulated by an encapsulant.

2. Description of the Related Art

FIG. 1 shows a conventional motor stator 8 including a plurality of pole plates 81. Coils 82 are wound around the pole plates 81. The pole plates 81 and the coils 82 are encapsulated by a waterproof encapsulant 83 to provide a sealed structure. Thus, the motor stator 8 is waterproof and moisture-proof. An example of such a motor stator 8 is disclosed in Taiwan Patent No. 1266469 entitled "WATERPROOF STRUCTURE FOR BRUSHLESS MOTOR".

The motor stator 8 is coupled to a rotor to form a motor. Air gaps exist between a permanent magnet on the rotor and the pole plates 81. When the motor stator 8 is energized to create an alternating magnetic field induced by the permanent magnet, the magnetic lines of force created by the permanent magnet pass through the air gaps and interact with the motor stator 8 to generate a flux linkage, driving the rotor to rotate. However, the air gaps between the permanent magnet and the pole plates 81 will be too small if the waterproof encapsulant 83 has a large thickness, leading to poor operational efficiency. On the other hand, the encapsulating effect will be adversely affected if the thickness of the waterproof encapsulant 83 is too small, adversely affecting the waterproof effect and the moisture-proof effect of the motor stator 8.

FIG. 2 shows another conventional motor stator 9 including a driving circuit board 91, a stator 92, and a housing 93 to which the driving circuit board 91 and the stator 92 are mounted. A separation sleeve 94 is mounted around the stator 92. The stator 92 and the separation sleeve 94 are encapsulated by a waterproof encapsulant 95 to provide the motor stator 9 with enhanced waterproof effect and enhanced moisture-proof effect. An example of such a motor stator 9 is disclosed in Taiwan Patent No. I323071 entitled "WATERPROOF MOTOR STATOR DEVICE AND METHOD FOR MAKING SAME".

The separation sleeve 94 mounted around the stator 92 permits an easy mold-removing operation of the motor stator 9. Since the waterproof encapsulant 95 encapsulates both of the stator 92 and the separation sleeve 94, the air gaps between the permanent magnet and the stator 92 are decreased due to the thickness of the separation sleeve 94 and the waterproof encapsulant 95 when the stator 92 is coupled with a rotor to form a motor, resulting in safety risks during operation of the motor. Improvement is, thus, required.

SUMMARY OF THE INVENTION

An objective of the present invention is to provide an encapsulated stator in which air gaps favorable to safe motor operation are provided between the encapsulated stator and a permanent magnet when the encapsulated stator is used in a motor.

Another objective of the present invention is to provide an encapsulated stator including a driving module with an enhanced sealing structure.

The present invention fulfills the above objectives by providing, in a first aspect, an encapsulated stator having a driving module coupled to a shaft tube. The driving module includes a silicon steel plate unit. A coil unit is wound around the silicon steel plate unit. A jacket is mounted to an outer periphery of the silicon steel plate unit of the driving module. The jacket includes an inner face and an outer face opposite to the inner face. The inner face of the jacket faces the driving module. An encapsulant is bonded to the driving module, the jacket, and the shaft tube. The encapsulant encapsulates the driving module. The encapsulant partially encapsulates the outer face of the jacket.

In a second aspect, an encapsulated stator includes a driving module having a silicon steel plate unit. A coil unit is wound around the silicon steel plate unit. A jacket is mounted to the silicon steel plate unit of the driving module. The jacket includes an inner face and an outer face opposite to the inner face. The inner face of the jacket faces the driving module. An encapsulant is bonded to the driving module, the jacket, and the shaft tube. The encapsulant encapsulates the driving module. The encapsulant partially encapsulates the outer face of the jacket.

In a third aspect, an encapsulated stator includes a driving module coupled to a base. The base includes a shaft tube. The driving module includes a silicon steel plate unit coupled to the shaft tube. A coil unit is wound around the silicon steel plate unit. A jacket is mounted to the silicon steel plate unit of the driving module. The jacket includes an inner face and an outer face opposite to the inner face. The inner face of the jacket faces the driving module. An encapsulant is bonded to the driving module, the jacket, and the base. The encapsulant encapsulates the driving module. The encapsulant partially encapsulates the outer face of the jacket.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

Figure 1:
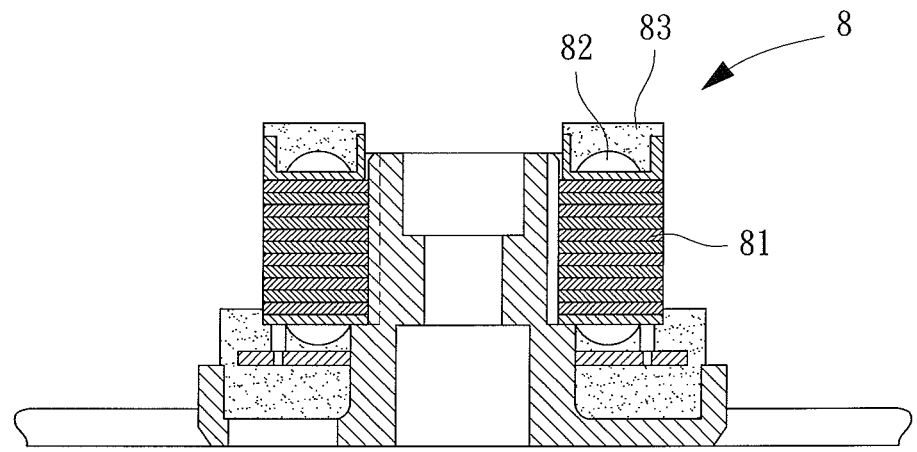
FIG. 1 shows a cross sectional view of a conventional motor stator.
Figure 2:
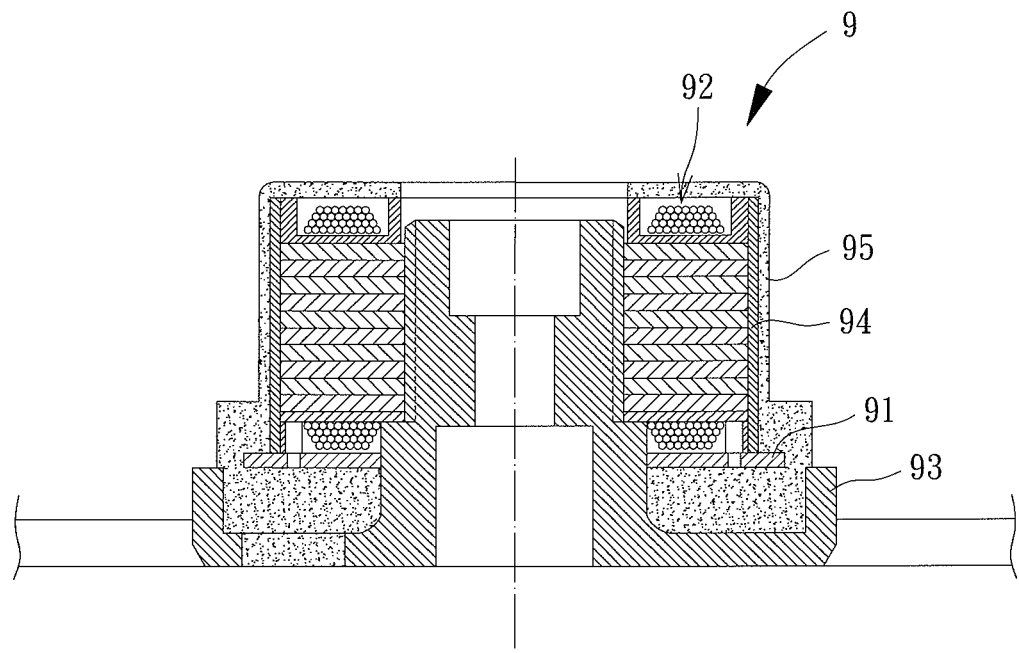
FIG. 2 shows a cross sectional view of another conventional stator.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "lower", "upper", "inner", "outer", "end", "portion", "section", "axial", "radial", "inward", "length", "height", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 3:
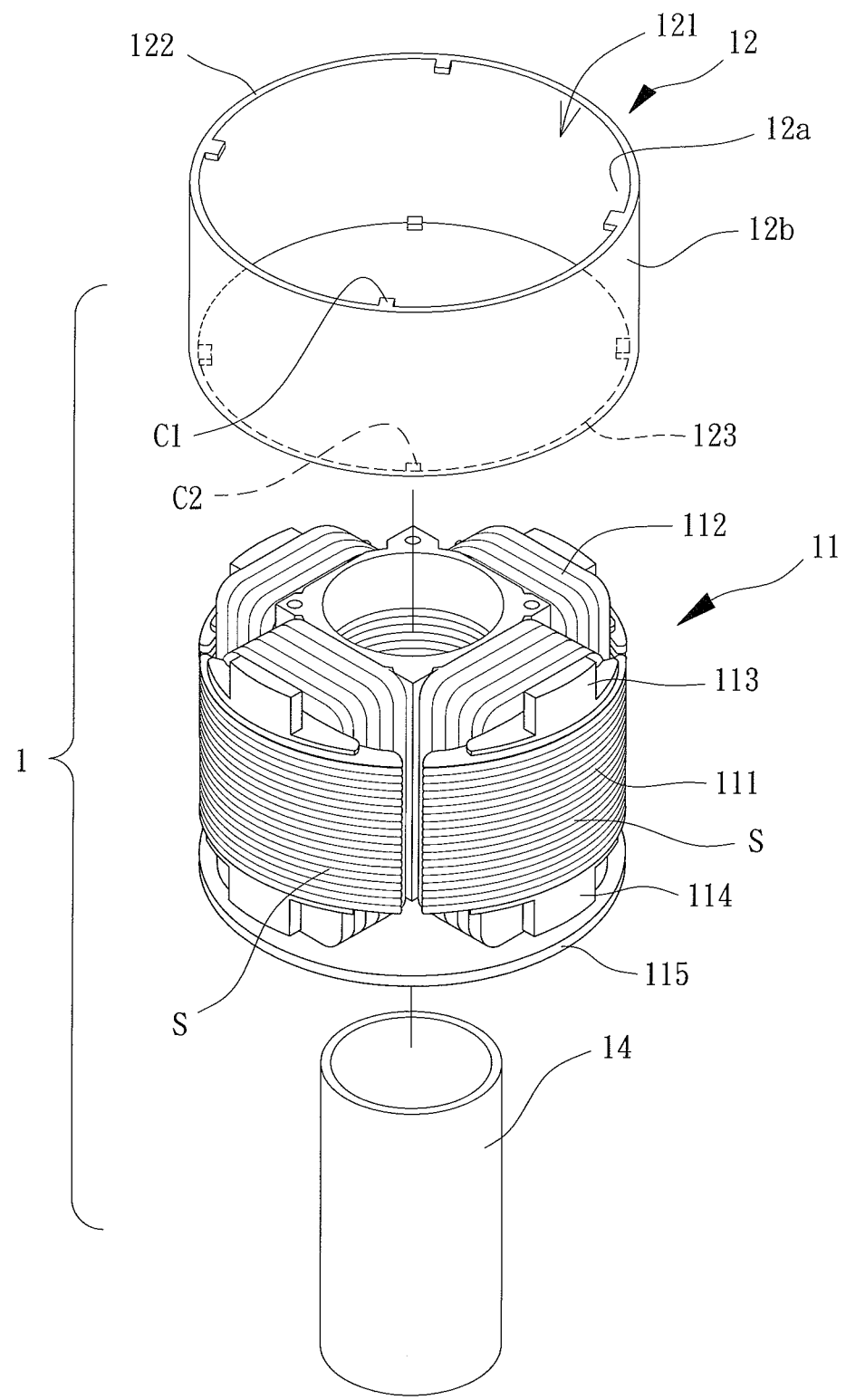
FIG. 3 shows an exploded, perspective view of an encapsulated stator of a first embodiment according to the present invention.
Figure 4:
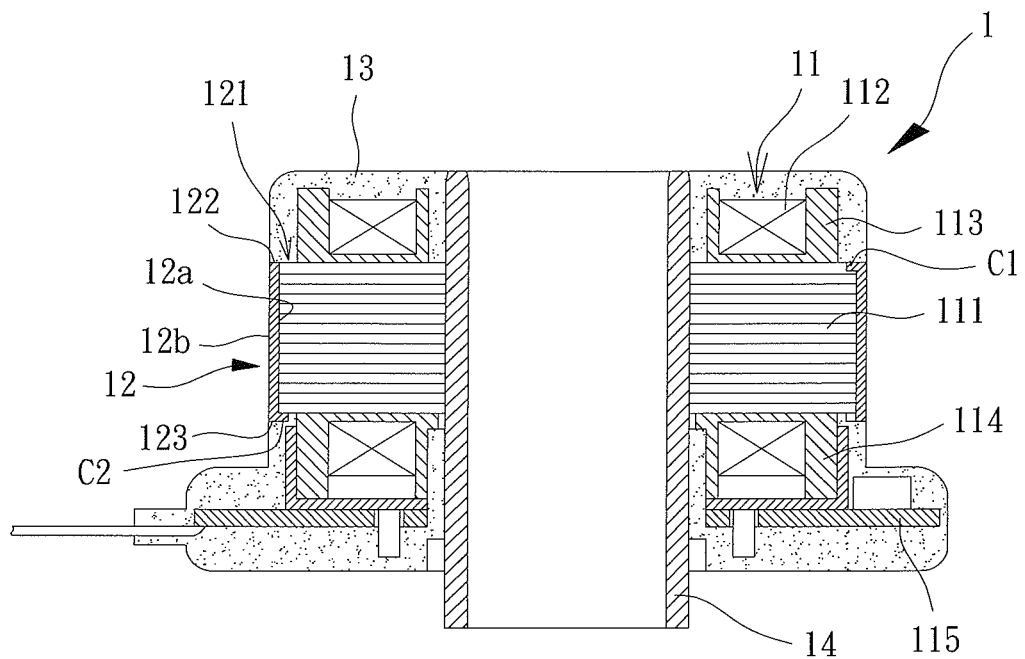
FIG. 4 shows a cross sectional view of the encapsulated stator of an example of the first embodiment according to the present invention, with an outer periphery of a sleeve fully exposed.

With reference to FIGS. 3 and 4, an encapsulated stator 1 of a first embodiment according to the present invention includes a driving module 11, a jacket 12 and an encapsulant 13. The jacket 12 is mounted to the driving module 11, and the encapsulant 13 encapsulates the driving module 11.

The driving module 11 is coupled to a shaft tube 14 that can be a metal shaft tube. The driving module 11 includes a silicon steel plate unit 111 and a coil unit 112. The silicon steel plate unit 111 is mounted to an outer periphery of the shaft tube 14. The coil unit 112 is wound around a predetermined portion of the silicon steel plate unit 111. Preferably, upper and lower insulating sleeves 113 and 114 are mounted to upper and lower ends of the silicon steel plate unit 111. The upper and lower insulating sleeves 113 and 114 are aligned with each other to allow easy winding of the coil unit 112 around outer peripheries of the upper and lower insulating sleeves 113 and 114. Thus, an enhanced winding quality is obtained by mounting the upper and lower insulating sleeves 113 and 114 around the silicon steel plate unit 111. The silicon steel plate unit 111 further includes a driving circuit board 115 electrically connected to the coil unit 112. Thus, the encapsulant 13 can also encapsulate the driving circuit board 115 to provide a better sealing and encapsulating effect. In a case that the driving module 11 does not include the driving circuit board 115, the coil unit 112 includes reserved wires for electrical connection with an external driving circuit board after the driving module 11 is encapsulated by the encapsulant 13.

The jacket 12 is mounted to the silicon steel plate unit 111 of the driving module 11 and includes opposite inner and outer faces 12a and 12b. The inner face 12a faces the driving module 11. The jacket 12 can be one or more members that can be in intimate contact with the outer periphery of the silicon steel plate unit 111. As an example, the jacket 12 can be in the form of a single ring mounted around the silicon steel plate unit 111. As another example, the jacket 12 can include a plurality of sections that are engaged with each other and mounted around the silicon steel plate unit 111. The jacket can be electrically non-conductive or magnetically non-conductive.

In this embodiment, the jacket 12 is in the form of a ring having an inner periphery that forms the inner face 12a and an outer periphery that forms the outer face 12b. The jacket 12 includes a coupling hole 121 having two ends each having an opening, with the openings aligned with each other. Thus, the jacket 12 can be directly mounted around the silicon steel plate unit 111 of the driving module 11. The jacket 12 includes first and second end faces 122 and 123 respectively surrounding the openings of the coupling hole 121.

The encapsulant 13 is bonded to the driving module 11, the jacket 12 and the shaft tube 14. The encapsulant 13 can be a resin with waterproof effect and moisture-proof effect. The encapsulant 13 can encapsulate the driving module 11 by using a mold (which can be appreciated by one having ordinary skill in the art) to provide the driving module 11 with an enhanced waterproof effect and an enhanced moisture-proof effect while exposing the outer face 12b. The outer face 12b of the jacket 12 can be fully or partially exposed.

In an example shown in FIG. 4, the outer face 12b of the jacket 12 is fully exposed. Specifically, the encapsulant 13 is bonded to the first and second end faces 122 and 123 of the jacket 12. However, the outer face 12b between the first and second end faces 122 and 123 of the jacket 12 is not covered by the encapsulant 13. Furthermore, the driving module 11 is sealed between the jacket 12, the encapsulant 13 and the shaft tube 14.

Figure 5:
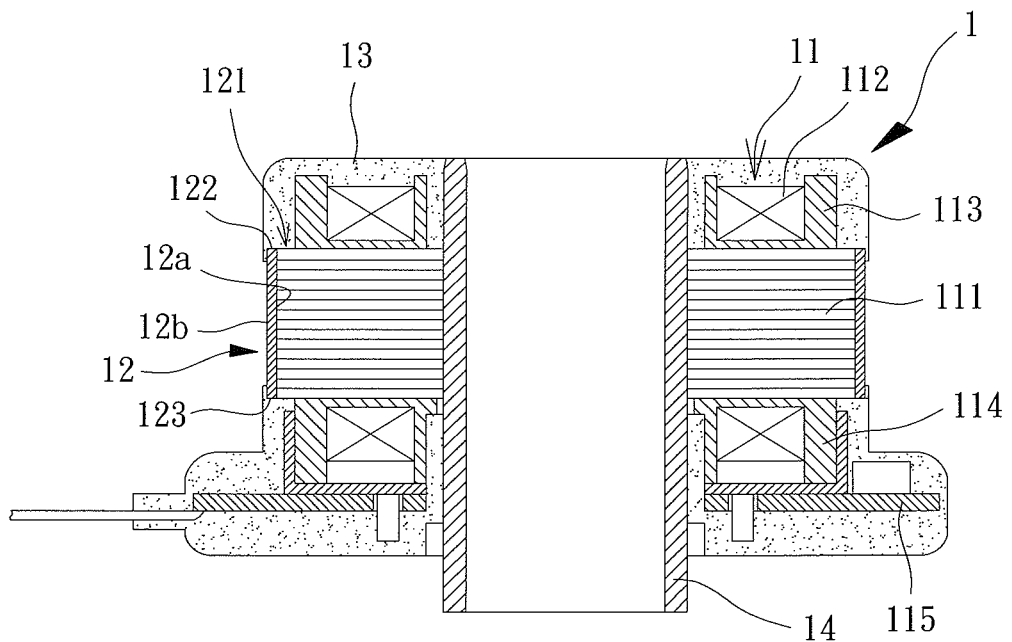
FIG. 5 shows a cross sectional view of the encapsulated stator of another example of the first embodiment according to the present invention, with an outer periphery of a sleeve partially exposed.

In another example shown in FIG. 5, the outer face 12b of the jacket 12 is partially exposed. Specifically, the encapsulant 13 is bonded to the first and second end faces 122 and 123 of the jacket 12. Furthermore, the encapsulant 13 is bonded to portions of the outer face 12b adjacent to the first and second end faces 122 and 123 of the jacket 12. Thus, a small portion of the outer face 12b of the jacket 12 is covered by the encapsulant 13. Furthermore, the driving module 11 is sealed between the jacket 12, the encapsulant 13 and the shaft tube 14.

Figure 6:
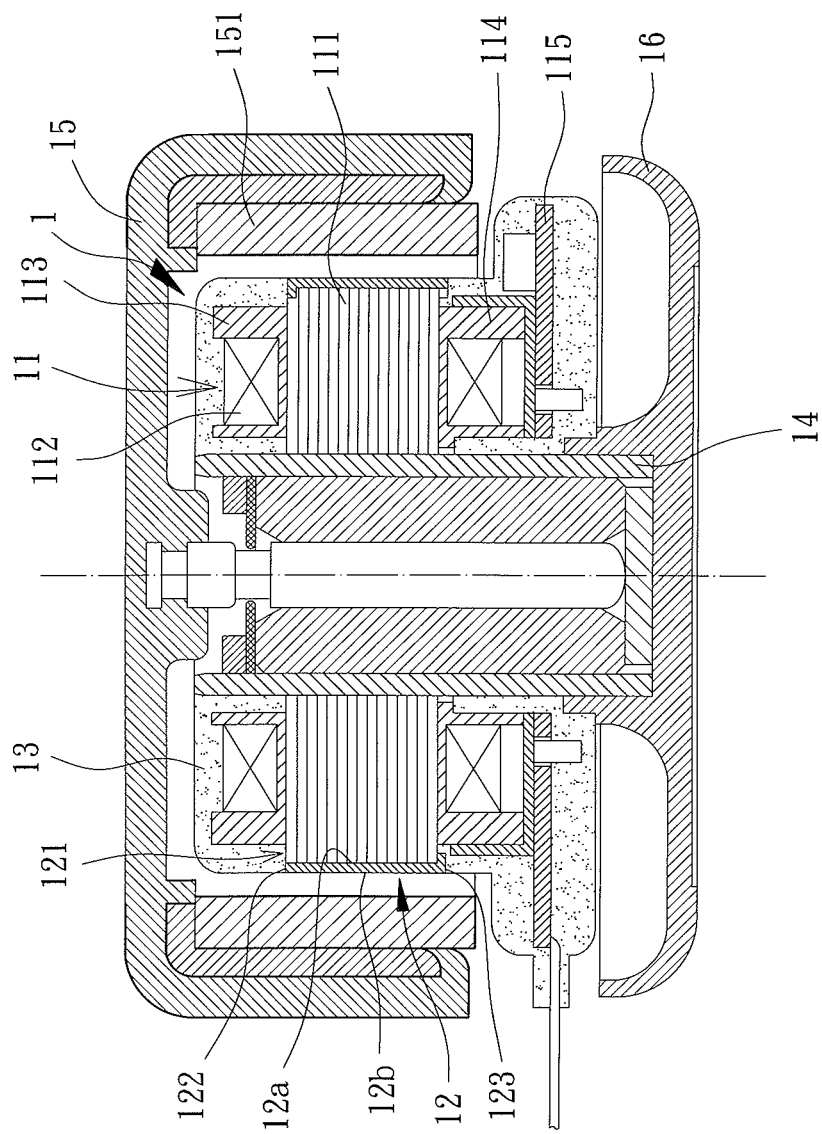
FIG. 6 shows a cross sectional view of a motor utilizing the encapsulated stator of the first embodiment according to the present invention.

With reference to FIG. 6, in use of the encapsulated stator 1 according to the present invention, a rotor 15 is coupled to the shaft tube 14 of the encapsulated stator 1. Bearings can be mounted in the shaft tube 14 for rotatably coupling the rotor 15 with the shaft tube 14. The shaft tube 14 is coupled to a seat 16 to form a motor. Air gaps exist between a permanent magnet 151 of the rotor 15 and the driving module 11 of the encapsulated stator 1. When the driving module 11 is energized to create an alternating magnetic field that is induced by the permanent magnet 151, the magnetic lines of force created by the permanent magnet 151 pass through the air gaps and interact with the driving module 11 to generate a flux linkage, driving the rotor 15 to rotate.

The main feature of the encapsulated stator 1 according to the present invention is that the encapsulant 13 can encapsulate the driving module 11 to form a sealed structure, providing the encapsulated stator 1 according to the present invention with an enhanced waterproof effect and an enhanced moisture-proof effect. Of more importance, the jacket 12 is mounted around the silicon steel plate unit 111 of the driving module 11. By such an arrangement, insufficient covering by the encapsulant 13 would not occur after the driving module 11 is encapsulated by the encapsulant 13. Furthermore, after the driving module 11 is encapsulated by the encapsulant 13, the outer face 12b of the jacket 12 is exposed. Thus, only the thickness of the jacket 12 is located between the permanent magnet 151 of the rotor 15 and the silicon steel plate unit 111 of the driving module 11. This assures a sufficient air gap length between the permanent magnet 151 and the driving module 11, enhancing safety during operation of the motor.

Figure 7:
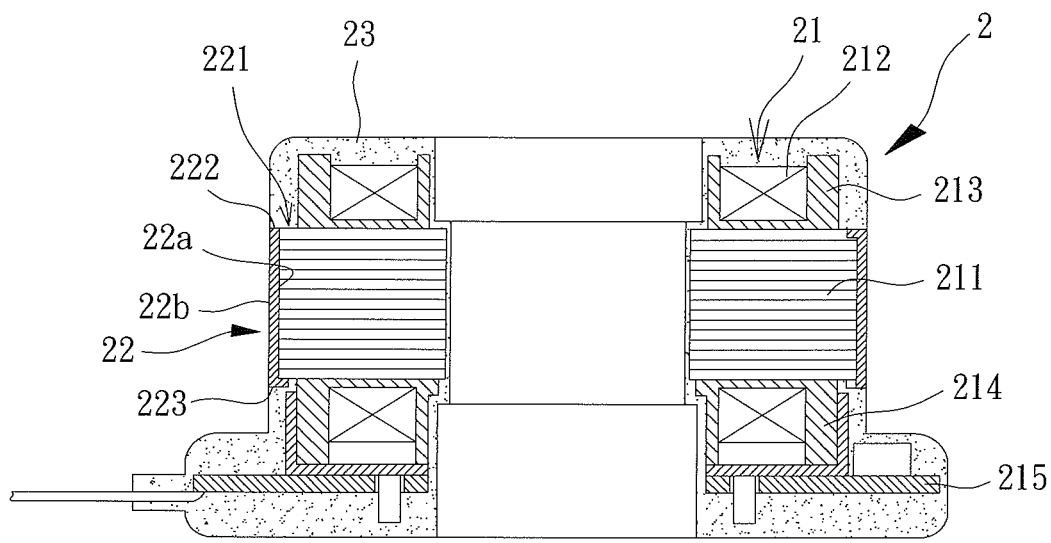
FIG. 7 shows a cross sectional view of an encapsulated stator of a second embodiment according to the present invention.

With reference to FIG. 7, an encapsulated stator 2 of a second embodiment according to the present invention includes a driving module 21, a jacket 22 and an encapsulant 23. Similar to the driving module 11, the jacket 12 and the encapsulant 13 of the first embodiment, the driving module 21, the jacket 22 and the encapsulant 23 also include a silicon steel plate unit 211, a coil unit 212, upper and lower insulating sleeves 213 and 214, a driving circuit board 215, inner and outer faces 22a and 22b, a coupling hole 221, and first and second end faces 222 and 223. Thus, the structural features of the encapsulated stator 2 of the second embodiment identical to those of the encapsulated stator 1 of the first embodiment will not be described in detail to avoid redundancy.

The difference between the encapsulated stator 2 of the second embodiment and the encapsulated stator 1 of the first embodiment is that the encapsulated stator 2 does not include the shaft tube 14 of the first embodiment. Thus, after having been bonded to the driving module 21 and the jacket 22, the encapsulant 23 further encapsulates the driving module 21 to completely seal the driving module 21. By such an arrangement, the encapsulant 23 provides the driving module 21 with enhanced sealing effect and effectively simplifies the overall structure of the encapsulated stator 2. When using the encapsulated stator 2 in a motor, the encapsulated stator 2 is simply assembled with a rotor and a shaft tube.

Figure 8:
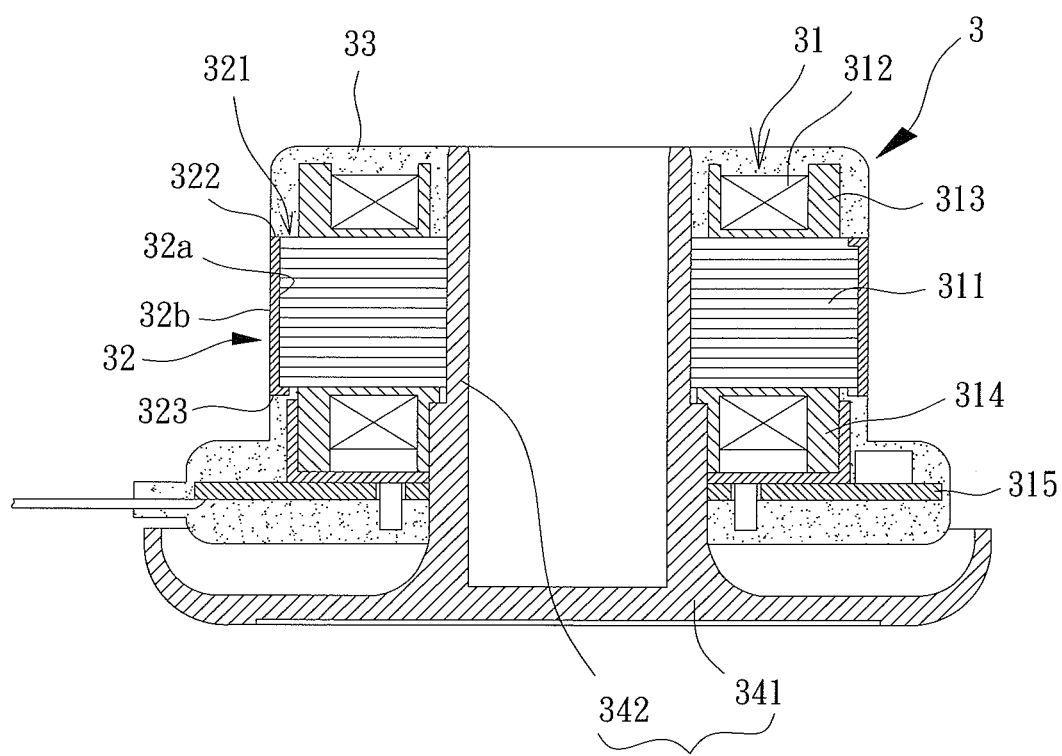
FIG. 8 shows a cross sectional view of an encapsulated stator of a third embodiment according to the present invention.

With reference to FIG. 8, an encapsulated stator 3 of a third embodiment according to the present invention includes a driving module 31, a jacket 32 and an encapsulant 33. Similar to the driving module 11, the jacket 12 and the encapsulant 13 of the first embodiment, the driving module 31, the jacket 32 and the encapsulant 33 also include a silicon steel plate unit 311, a coil unit 312, upper and lower insulating sleeves 313 and 314, a driving circuit board 315, inner and outer faces 32a and 32b, a coupling hole 321, and first and second end faces 322 and 323. Thus, the structural features of the encapsulated stator 3 of the third embodiment identical to those of the encapsulated stator 1 of the first embodiment will not be described in detail to avoid redundancy.

The difference between the encapsulated stator 3 of the third embodiment and the encapsulated stator 1 of the first embodiment is that the encapsulated stator 3 does not include the shaft tube 14 of the first embodiment. The driving module 31 is coupled to a base 34 including a seat 341 and a shaft tube 342 mounted on a top face of the seat 341. The seat 341 and the shaft tube 342 can be formed of plastic material by injection molding. Furthermore, the silicon steel plate unit 311 of the driving module 31 is mounted to the outer periphery of the shaft tube 342. After having been bonded to the driving module 31, the jacket 32 and the base 34, the encapsulant 33 encapsulates the driving module 31 to seal the driving module 31 between the jacket 32, the encapsulant 33, and the shaft tube 342 of the base 34. Thus, when using the encapsulated stator 3 in a motor, only assembly with a rotor is required, providing an enhanced assembling convenience.

Based on the above concept, the encapsulated stators 1, 2 and 3 of the first, second and third embodiments according to the present invention can be embodied to provide more functions.

With reference to FIG. 3 (taking the first embodiment as an example), the jacket 12 includes a plurality of first engagement blocks C1 extending radially inward from the first end face 122 and a plurality of second engagement blocks C2 extending radially inward from the second end face 123. Each second engagement block C2 can pass through a gap between two adjacent shoe portions S of the silicon steel plate unit 111, such that the jacket 12 can be smoothly mounted around the silicon steel plate unit 111 of the driving module 11. Then, the jacket 12 is rotated through a small angle so that the first and second engagement blocks C1 and C2 are engaged with upper and lower ends of the silicon steel plate unit 111 (see FIG. 4), providing an enhanced positioning effect. Preferably, each first engagement block C1 is not aligned with any second engagement block C2. After passing the second engagement blocks C2 through the gaps between the shoe portions S of the silicon steel plate unit 111 and rotating the jacket 12 through a small angle, the second engagement blocks C2 are not aligned with the gaps between the shoe portions S, more effectively avoiding disengagement of the jacket 12 from the driving module 11.

Figure 9:
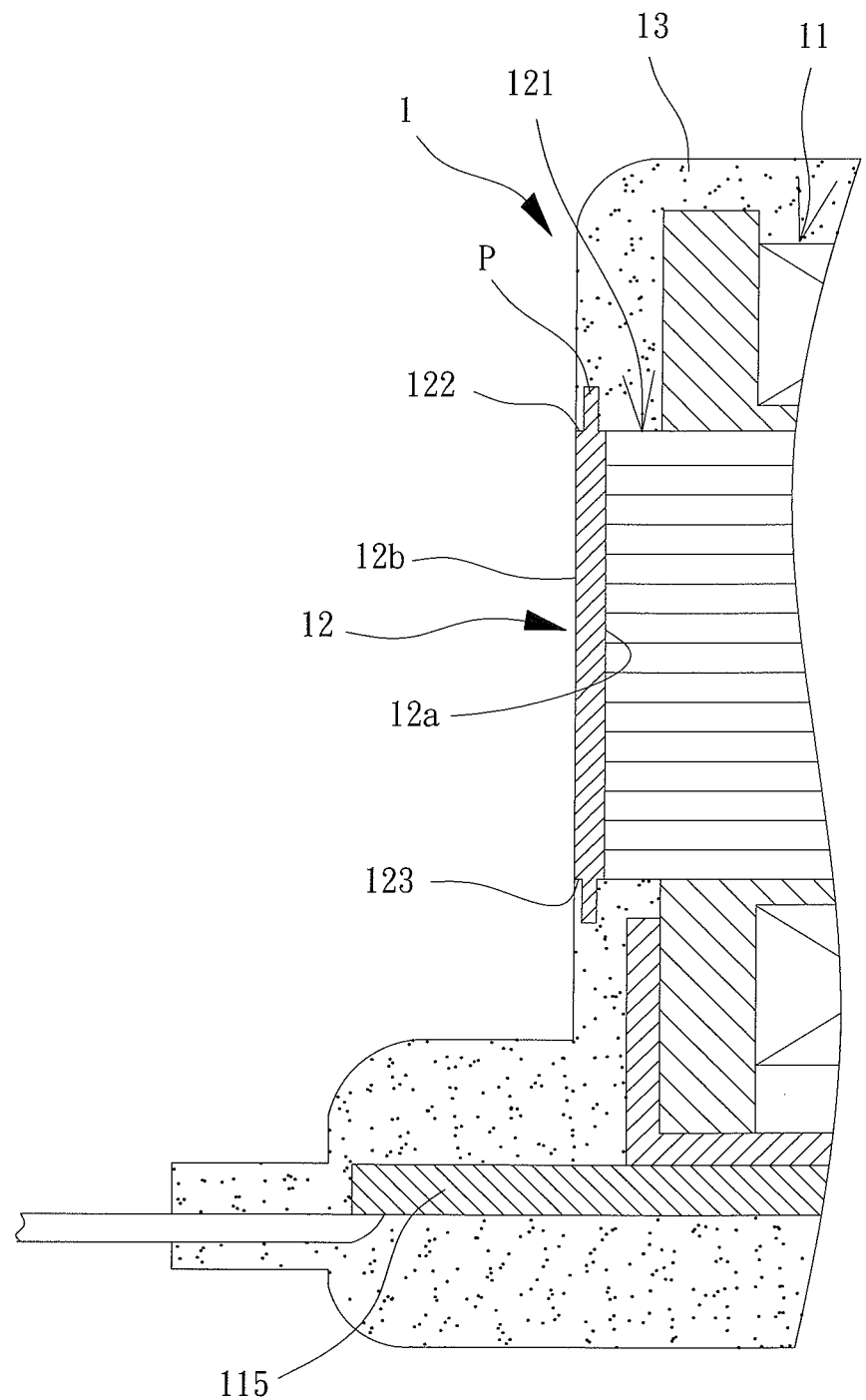
FIG. 9 shows a partial, cross sectional view of a modified example of the encapsulated stator according to the present invention, with the sleeve including protrusions.
Figure 10:
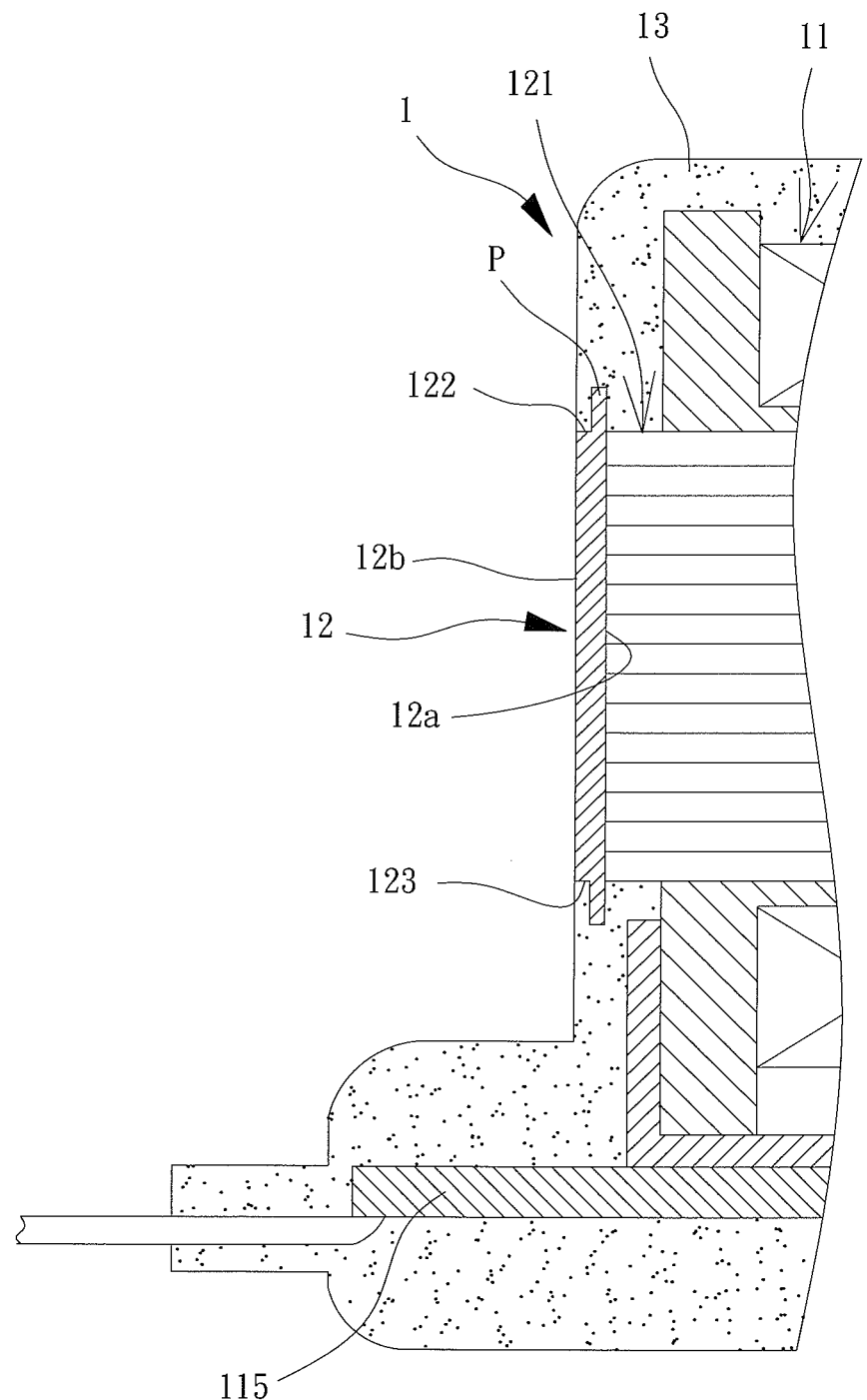
FIG. 10 shows a partial, cross sectional view of another modified example of the encapsulated stator according to the present invention, with the sleeve including protrusions.
Figure 11:
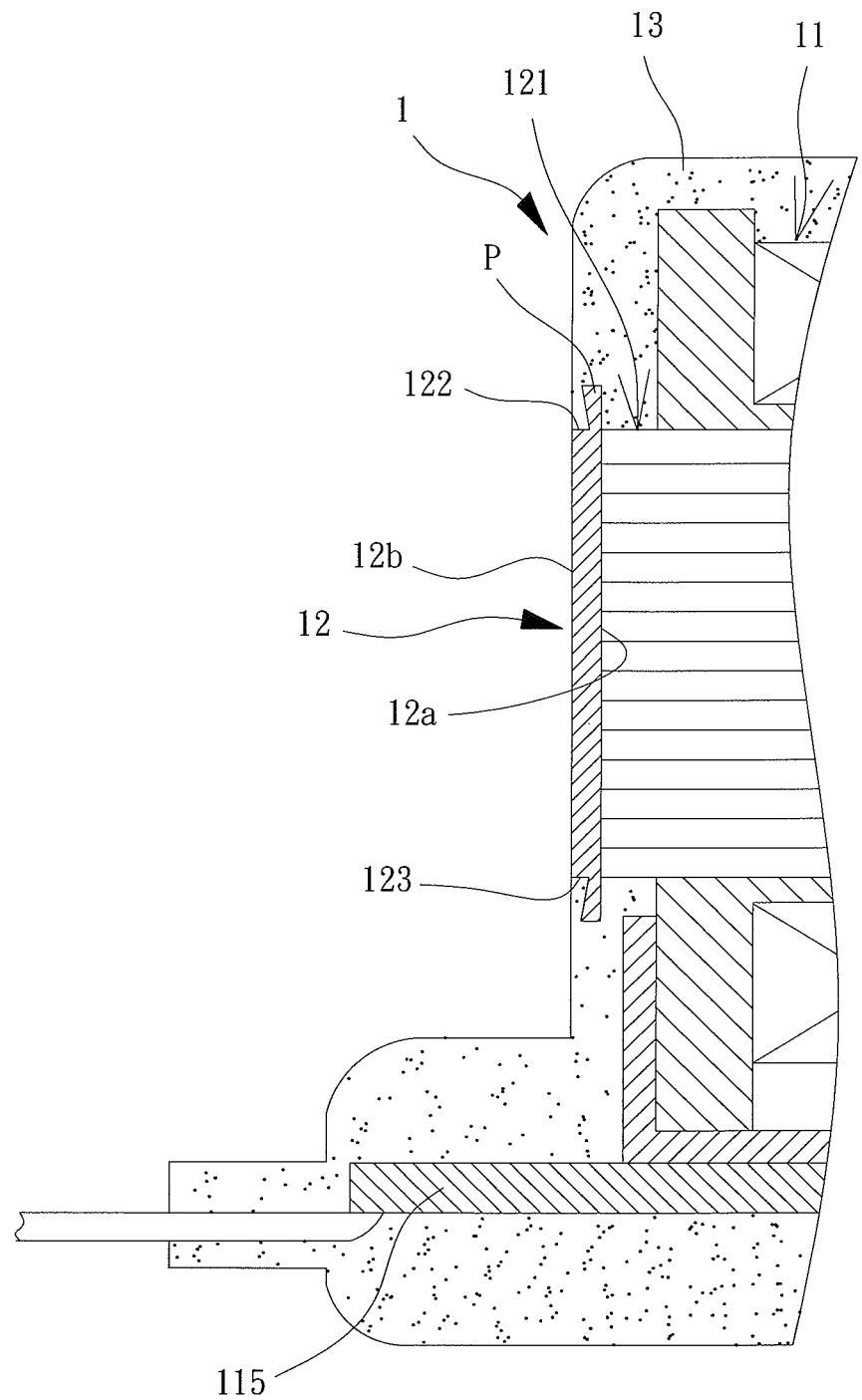
FIG. 11 shows a partial, cross sectional view of a further modified example of the encapsulated stator according to the present invention, with the sleeve including protrusions.

With reference to FIGS. 9 and 10 (taking the first embodiment as an example), a plurality of protrusions P extends in an axial direction from each of the first and second end faces 122 and 123 of the jacket 12. When the encapsulant 13 is bonded to the first and second end faces 122 and 123 of the jacket 12, the encapsulant 13 also covers the protrusions P to increase the engagement area between the encapsulant 13 and the jacket 12, increasing the engagement reliability therebetween. With reference to FIG. 11, each protrusion P can include an inclined face to provide an enhanced disengagement-preventing effect after the encapsulant 13 covers each protrusion P.

With reference to FIG. 4 (taking the first embodiment as an example), a height of the jacket 12 in the axial direction is equal to that of the silicon steel plate unit 111 of the driving module 11 in the axial direction. Thus, the jacket 12 can completely cover the silicon steel plate unit 111 to provide an enhanced waterproof effect and an enhanced moisture-proof effect. With reference to FIGS. 9-11, the height of the jacket 12 in the axial direction is larger than that of the silicon steel plate unit 111 of the driving module 11 in the axial direction to provide an enhanced waterproof effect and an enhanced moisture-proof effect as well as an enhanced disengagement-preventing effect.

In view of the foregoing, by utilizing the encapsulant 13, 23, 13 to encapsulate the driving module 11, 21, 31 and by mounting the jacket 12, 22, 32 to the silicon steel plate unit 111, 211, 311 of the driving module 11, 21, 31 to provide a sealed structure, the encapsulated stator 1, 2, 3 according to the present invention avoids insufficient encapsulation of the encapsulant 13, 23, 33, providing an enhanced waterproof effect and an enhanced moisture-proof effect.

When the encapsulated stator 1, 2, 3 according to the present invention is utilized in a motor, provision of the exposed outer face 12b, 22b, 32b assures a sufficient air gap length between the permanent magnet and the driving module 11, 21, 31, enhancing safety during operation of the motor.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:
1. An encapsulated stator comprising:
a driving module coupled to a shaft tube, with the driving module including a silicon steel plate unit having an outer periphery, with a coil unit wound around the silicon steel plate unit;
a jacket mounted to the outer periphery of the silicon steel plate unit of the driving module, with the jacket includ- ing an inner face and an outer face opposite to the inner face, with the inner face of the jacket facing the driving module; and an encapsulant bonded to the driving module, the jacket and the shaft tube, with the encapsulant encapsulating the driving module, with the encapsulant partially encapsulating the outer face of the jacket, with a part of the outer face of the jacket not encapsulated by the encapsulant, with the jacket including a coupling hole receiving the silicon steel plate unit, with the jacket mounted around the outer periphery of the silicon steel plate unit, with the coupling hole having two ends each having an opening, with the openings aligned with each other, with the jacket including first and second end faces respectively surrounding the openings of the coupling hole, with the jacket including a plurality of circumferentially spaced first engagement blocks extending radially inward from the first end face and a plurality of circumferentially spaced second engagement blocks extending radially inward from the second end face, with the plurality of first engagement blocks engaged with an upper end of the silicon steel plate unit, with the plurality of second engagement blocks engaged with a lower end of the silicon steel plate unit, wherein the silicon steel plate unit further comprises a plurality of circumferentially spaced shoe portions, wherein a gap is formed between two adjacent shoe portions, wherein each of the plurality of first circumferentially spaced engagement blocks and each of the plurality of second engagement blocks extend through a respective one of the gaps of the plurality of circumferentially spaced shoe portions when the jacket is fitted around the silicon steel plate unit.

2. The encapsulated stator as claimed in claim 1, wherein the outer face of the jacket is fully exposed.

3. The encapsulated stator as claimed in claim 2, with the encapsulant bonded to the first and second end faces of the jacket.

4. The encapsulated stator as claimed in claim 1, wherein the outer face of the jacket is partially exposed.

5. The encapsulated stator as claimed in claim 4, with the encapsulant bonded to the first and second end faces of the jacket and to portions of the outer face adjacent to the first and second end faces of the jacket.

6. The encapsulated stator as claimed in claim 1, with the driving module further including a driving circuit board electrically connected to the coil unit, with the driving circuit board encapsulated by the encapsulant.

7. The encapsulated stator as claimed in claim 1, with the silicon steel plate unit including two ends, with upper and lower insulating sleeves mounted to the two ends of the silicon steel plate unit, with the upper and lower insulating sleeves aligned with each other, with the coil unit wound around outer peripheries of the upper and lower insulating sleeves.

8. The encapsulated stator as claimed in claim 1, with the plurality of circumferentially spaced first engagement blocks not aligned with the plurality of circumferentially spaced second engagement blocks.

9. The encapsulated stator as claimed in claim 1, with a plurality of protrusions extending in an axial direction from each of the first and second end faces of the jacket, with the encapsulant encapsulating the plurality of protrusions on each of the first and second end faces of the jacket.

10. The encapsulated stator as claimed in claim 9, with each of the plurality of protrusions including an inclined face.

11. The encapsulated stator as claimed in claim 1, with the jacket having a height in the axial direction larger than a height of the silicon steel plate unit of the driving module in the axial direction.

12. The encapsulated stator as claimed in claim 1, with the jacket having a height in the axial direction equal to a height of the silicon steel plate unit of the driving module in the axial direction.

13. The encapsulated stator as claimed in claim 1, with the shaft tube being a metal shaft tube.

14. The encapsulated stator as claimed in claim 1, with the jacket being electrically non-conductive or magnetically non-conductive.

15. An encapsulated stator comprising:
a driving module including a silicon steel plate unit, with a coil unit wound around the silicon steel plate unit;
a jacket mounted to the silicon steel plate unit of the driving module, with the jacket including an inner face and an outer face opposite to the inner face, with the inner face of the jacket facing the driving module; and
an encapsulant bonded to the driving module and the jacket, with the encapsulant encapsulating the driving module, with the encapsulant partially encapsulating the outer face of the jacket, with a part of the outer face of the jacket not encapsulated by the encapsulant, with the jacket including a coupling hole receiving the silicon steel plate unit, with the jacket mounted around the outer periphery of the silicon steel plate unit, with the coupling hole having two ends each having an opening, with the openings aligned with each other, with the jacket including first and second end faces respectively surrounding the openings of the coupling hole, with the jacket including a plurality of circumferentially spaced first engagement blocks extending radially inward from the first end face and a plurality of circumferentially spaced second engagement blocks extending radially inward from the second end face, with the plurality of circumferentially spaced first engagement blocks engaged with an upper end of the silicon steel plate unit, with the plurality of circumferentially spaced second engagement blocks engaged with a lower end of the silicon steel plate unit, wherein the silicon steel plate unit further comprises a plurality of circumferentially spaced shoe portions, wherein a gap is formed between two adjacent shoe portions, wherein each of the plurality of circumferentially spaced first engagement blocks and each of the plurality of circumferentially spaced second engagement blocks extend through a respective one of the gaps of the plurality of circumferentially spaced shoe portions when the jacket is fitted around the silicon steel plate unit.

16. The encapsulated stator as claimed in claim 15, wherein the outer face of the jacket is fully exposed.

17. The encapsulated stator as claimed in claim 16, with the encapsulant bonded to the first and second end faces of the jacket.

18. The encapsulated stator as claimed in claim 15, wherein the outer face of the jacket is partially exposed.

19. The encapsulated stator as claimed in claim 18, with the encapsulant bonded to the first and second end faces of the jacket and to portions of the outer face adjacent to the first and second end faces of the jacket.

20. The encapsulated stator as claimed in claim 15, with the driving module further including a driving circuit board electrically connected to the coil unit, with the driving circuit board encapsulated by the encapsulant.

21. The encapsulated stator as claimed in claim 15, with the silicon steel plate unit including two ends, with upper and lower insulating sleeves mounted to the two ends of the silicon steel plate unit, with the upper and lower insulating sleeves aligned with each other, with the coil unit wound around outer peripheries of the upper and lower insulating sleeves.

22. The encapsulated stator as claimed in claim 15, with the plurality of circumferentially spaced first engagement blocks not aligned with the plurality of circumferentially spaced second engagement blocks.

23. The encapsulated stator as claimed in claim 15, with a plurality of protrusions extending in an axial direction from each of the first and second end faces of the jacket, with the encapsulant encapsulating the plurality of protrusions on each of the first and second end faces of the jacket.

24. The encapsulated stator as claimed in claim 23, with each of the plurality of protrusions including an inclined face.

25. The encapsulated stator as claimed in claim 15, with the jacket having a height in the axial direction larger than a height of the silicon steel plate unit of the driving module in the axial direction.

26. The encapsulated stator as claimed in claim 15, with the jacket having a height in the axial direction equal to a height of the silicon steel plate unit of the driving module in the axial direction.

27. The encapsulated stator as claimed in claim 15, with the jacket being electrically non-conductive or magnetically non-conductive.

28. An encapsulated stator comprising:
a driving module coupled to a base, with the base including a shaft tube, with the driving module including a silicon steel plate unit coupled to the shaft tube, with a coil unit wound around the silicon steel plate unit;
a jacket mounted to the silicon steel plate unit of the driving module, with the jacket including an inner face and an outer face opposite to the inner face, with the inner face of the jacket facing the driving module; and
an encapsulant bonded to the driving module, the jacket and the base, with the encapsulant encapsulating the driving module, with the encapsulant partially encapsulating the outer face of the jacket, with a part of the outer face of the jacket not encapsulated by the encapsulant,
with the jacket including a coupling hole receiving the silicon steel plate unit, with the jacket mounted around the outer periphery of the silicon steel plate unit, with the coupling hole having two ends each having an opening, with the openings aligned with each other, with the jacket including first and second end faces respectively surrounding the openings of the coupling hole,
with the jacket including a plurality of circumferentially spaced first engagement blocks extending radially inward from the first end face and a plurality of circumferentially spaced second engagement blocks extending radially inward from the second end face, with the plurality of circumferentially spaced first engagement blocks engaged with an upper end of the silicon steel plate unit, with the plurality of circumferentially spaced second engagement blocks engaged with a lower end of the silicon steel plate unit,
wherein the silicon steel plate unit further comprises a plurality of circumferentially spaced shoe portions, wherein a gap is formed between two adjacent shoe portions, wherein each of the plurality of circumferentially spaced first engagement blocks and each of the plurality of circumferentially spaced second engagement blocks extend through a respective one of the gaps of the plurality of circumferentially spaced shoe portions when the jacket is fitted around the silicon steel plate unit.

29. The encapsulated stator as claimed in claim 18, wherein the outer face of the jacket is fully exposed.

30. The encapsulated stator as claimed in claim 29, with the encapsulant bonded to the first and second end faces of the jacket.

31. The encapsulated stator as claimed in claim 28, wherein the outer face of the jacket is partially exposed.

32. The encapsulated stator as claimed in claim 31, with the encapsulant bonded to the first and second end faces of the jacket and to portions of the outer face adjacent to the first and second end faces of the jacket.

33. The encapsulated stator as claimed in claim 28, with the driving module further including a driving circuit board electrically connected to the coil unit, with the driving circuit board encapsulated by the encapsulant.

34. The encapsulated stator as claimed in claim 28, with the silicon steel plate unit including two ends, with upper and lower insulating sleeves mounted to the two ends of the silicon steel plate unit, with the upper and lower insulating sleeves aligned with each other, with the coil unit wound around outer peripheries of the upper and lower insulating sleeves.

35. The encapsulated stator as claimed in claim 28, with the plurality of circumferentially spaced first engagement blocks not aligned with the plurality of circumferentially spaced second engagement blocks.

36. The encapsulated stator as claimed in claim 28, with a plurality of protrusions extending in an axial direction from each of the first and second end faces of the jacket, with the encapsulant encapsulating the plurality of protrusions on each of the first and second end faces of the jacket.

37. The encapsulated stator as claimed in claim 28, with each of the plurality of protrusions including an inclined face.

38. The encapsulated stator as claimed in claim 28, with the jacket having a height in the axial direction larger than a height of the silicon steel plate unit of the driving module in the axial direction.

39. The encapsulated stator as claimed in claim 28, with the jacket having a height in the axial direction equal to a height of the silicon steel plate unit of the driving module in the axial direction.

40. The encapsulated stator as claimed in claim 28, with the shaft tube being a plastic shaft tube made by injection molding.

41. The encapsulated stator as claimed in claim 28, with the jacket being electrically non-conductive or magnetically non-conductive.

\* \* \* \* \*